US005468690A

United States Patent [19]

Sekhar et al.

[11] Patent Number: 5,468,690

[45] Date of Patent: Nov. 21, 1995

[54] COMBUSTIBLE SLURRY FOR JOINING METALLIC OR CERAMIC SURFACES OR FOR COATING METALLIC, CERAMIC AND REFRACTORY SURFACES

[75] Inventors: Jainagesh A. Sekhar; V. Subramanian; Necip S. Canarslan, all of Cincinnati, Ohio

[73] Assignee: University of Cincinnati, Cincinnati, Ohio

[21] Appl. No.: 196,905

[22] Filed: Feb. 15, 1994

Related U.S. Application Data

[63] Continuation of Ser. No. 787,091, Nov. 4, 1991, abandoned, which is a continuation-in-part of Ser. No. 753,216, Aug. 30, 1991, abandoned.

[51] Int. Cl.[6] .......................... C04B 35/00; C04B 35/56; C04B 35/44

[52] U.S. Cl. .................................. 501/1; 501/87; 501/93; 501/96; 501/99; 501/100; 501/127; 501/153; 106/691; 106/286.4; 106/286.5; 106/287.17; 106/287.19

[58] Field of Search ................................ 106/691, 286.4, 106/286.5, 287.17, 287.19; 501/87, 93, 96, 99, 100, 127, 153, 1

[56] References Cited

U.S. PATENT DOCUMENTS 2,496,971 2/1950 Wiezer .................................. 427/192
4,131,473 12/1987 Kachik et al. ........................ 106/1.12
4,432,799 2/1984 Salazar .................................. 106/691

FOREIGN PATENT DOCUMENTS 0240525 3/1969 U.S.S.R. ............................... 106/691

OTHER PUBLICATIONS

Chemical Abstracts, vol. 104, No. 18 Columbus, Ohio, US; abstract No. 18 (Dec. 1985) Y. Miyamoto et al. 'Bonding of metal and ceramics' see abstract & JP, A, 60 251 177 (Osaka University et al.).

Chemical Abstracts, vol. 114, No. 8 Columbus, Ohio, US; abstract No. 67830m, E. Udagawa "Formation of titanium diboride sintered layer on ceramic or metal substrates" see abstract & JP, A, 02 155 728 (Fujitsu Ltd.) (Dec. 1988).

Patent Abstracts of Japan vol. 11, No. 394 (C–465) (2841) (23 Dec. 1987) & JP, A, 62 156 271 (Agency of Industrial Science & Technology) see abstract.

*Primary Examiner*—David Brunsman
*Attorney, Agent, or Firm*—Frost & Jacobs

[57] ABSTRACT

A slurry for joining metallic or ceramic surfaces or for coating metallic or ceramic and refractory surfaces, comprising a liquid suspending medium and at least two constituents in particulate form suspended in the medium, the constituents being so selected and proportioned as to undergo combustion synthesis when ignited. A method for coating or joining metallic or ceramic surfaces comprises applying such a slurry to a surface to be coated or to surfaces to be joined, and igniting the slurry to cause combustion synthesis.

8 Claims, No Drawings

COMBUSTIBLE SLURRY FOR JOINING METALLIC OR CERAMIC SURFACES OR FOR COATING METALLIC, CERAMIC AND REFRACTORY SURFACES

This is a continuation of application Ser. No. 07/787,091, filed Nov. 4, 1991, now abandoned, which is a continuation-in-part of application Ser. No. 07/753,216 filed Aug. 30, 1991, abandoned.

BACKGROUND OF THE INVENTION

1. Field of the Invention

The present invention relates to a slurry which undergoes exothermic reaction by combustion synthesis when ignited, and methods for the use thereof in joining metallic or ceramic surfaces or for coating metallic, ceramic and refractory surfaces. Although not so limited, slurries of the invention have particular utility in joining stainless steel, aluminum, carbon steel and copper workpieces and in forming coatings on porous silica or aluminum oxide substrates which resist chemical attack, ingress and attack by molten alloys having high melting temperatures.

2. Prior Art

Joints between metal pieces are conventionally formed by welding or brazing, by means of a wide variety of techniques using an oxyacetylene torch, or the like. Brazing compositions for joining metal pieces by fusion are also well known. To the best of applicant's knowledge there have been no suggestions in the prior art to use a slurry for joining metallic pieces, the constituents of which are so selected and proportioned as to undergo exothermic reaction by combustion synthesis when ignited, thereby welding the metal pieces together.

Ceramic materials such as silica, alumina, zirconia and the like are used for containing molten metals, in furnaces for melting metals, in armor for missiles and the like, as infrared sensors, in electronic packaging, in engine materials, and in related applications. Such ceramic materials are frequently porous because they are made from powders which are sintered. Although porosity may be beneficial in imparting low density and specific toughness, porosity is detrimental from the standpoint of chemical attack, ingress into the ceramic or refractory material and resistance against attack by molten alloys at high temperature. Expensive fabrication is necessary to obtain a ceramic material of the above type in a fully densified condition. The prior art has resorted to coating ceramic surfaces in order to eliminate ingress or diffusion of material such as molten metal into the ceramic. No generally suitable technique is known to applicant to solve the problems inherent in coating ceramic or refractory surfaces.

Despite the existence of a wide variety of welding and brazing techniques and compositions, and despite the prior art suggestions for coating porous ceramic or refractory surfaces, a genuine need exists for alternative compositions and methods for joining metallic or ceramic surfaces or for coating metallic, ceramic and refractory surfaces.

SUMMARY OF THE INVENTION

It is an object of the invention to provide a slurry for joining metallic or ceramic surfaces or for coating metallic, ceramic and refractory surfaces, by the use of constituents which undergo exothermic reaction by combustion synthesis.

It is a further object of the invention to provide methods for joining metal or ceramic surfaces and for coating metallic, ceramic and refractory surfaces by means of slurries which undergo exothermic reaction by combustion synthesis.

According to the invention there is provided a slurry for joining metallic or ceramic surfaces or for coating metallic or ceramic and refractory surfaces, the slurry comprising a liquid suspending medium and at least two constituents suspended in particulate form in the medium and selected from the group consisting of titanium dioxide, boron oxide, aluminum oxide, aluminum, silicon, titanium, boron, nickel, phosphorus, chromic oxide, carbon, niobium, zirconium, tantalum, molybdenum, hafnium, and vanadium, the constituents being so selected and proportioned as to undergo exothermic reaction by combustion synthesis when ignited.

Liquid suspending mediums are monoaluminum phosphate, colloidal silica, methyl cellulose, alcohols, acetone, water, sodium silicate, and combinations of common acids and bases.

Optionally, the slurry may also contain diluents or reinforcing agents, which do not undergo combustion synthesis, in particulate form, including but not limited to metals such as aluminum, iron, copper and silver, and non-metallics such as borides, carbides, nitrides, oxides and silicides of titanium, niobium, and chromium.

A slurry for coating metallic or ceramic and refractory surfaces, in accordance with the invention, comprises a liquid suspending medium and particulate constituents suspended in the medium capable of undergoing exothermic reaction by combustion synthesis when ignited, the constituents being selected from the group consisting of titanium and crystalline carbon; titanium and amorphous carbon; titanium and aluminum; aluminum, titanium dioxide, and boron oxide; aluminum oxide, titanium, and amorphous carbon; and mixtures thereof.

A slurry for joining metallic or ceramic surfaces, in accordance with the invention, comprises a liquid suspending medium and particulate constituents suspended in the medium capable of undergoing exothermic reaction by combustion synthesis when ignited, the constituents being selected from the group consisting of titanium dioxide, boron oxide, aluminum, titanium, boron, nickel and phosphorus; titanium and boron; titanium, boron, nickel and phosphorus; chromic oxide, carbon and aluminum; and mixtures thereof.

A method of coating metallic or ceramic and refractory surfaces in accordance with the invention comprises the steps of providing a slurry having a liquid suspending medium and particulate constituents suspended in the medium capable of undergoing exothermic reaction by combustion synthesis when ignited, the constituents being selected from the group consisting of titanium and crystalline carbon; titanium and amorphous carbon; titanium and aluminum; aluminum, titanium dioxide and boron oxide; aluminum oxide, titanium, and amorphous carbon; and mixtures thereof; applying the slurry to a metallic, ceramic or refractory surface so as to form a layer of uniform thickness thereon; and igniting the layer to cause combustion synthesis thereof; thereby forming an adherent coating of titanium carbide; titanium aluminide; a titanium boride and aluminum oxide composite; or an aluminum oxide, titanium dioxide and titanium carbide composite.

The invention further provides a method of joining metallic or ceramic surfaces, which comprises the steps of providing a slurry having a liquid suspending medium and particulate constituents suspended in the medium capable of undergoing exothermic reaction by combustion synthesis when ignited, the constituents being selected from the group consisting of titanium dioxide, boron oxide, aluminum, titanium, boron, nickel and phosphorus; titanium and boron; titanium, boron, nickel and phosphorus; chromic oxide, carbon and aluminum; and mixtures thereof; applying the slurry to metallic or ceramic surfaces to be joined, placing the metallic or ceramic surfaces in abutting relation with the applied slurry therebetween; and igniting the slurry to cause combustion synthesis thereof at a temperature sufficient to fuse the metallic or ceramic surfaces together.

DETAILED DESCRIPTION OF THE INVENTION

In the embodiment of the invention adapted for coating ceramic and refractory surfaces, preferred particulate constituents comprise, in weight percent based on the total weight of constituents, the following groups:

- from 75% to 85% titanium, and 15% to 25% crystalline carbon;
- from 75% to 85% titanium, and 15% to 25% amorphous carbon;
- from 60% to 68% titanium, and 32% to 40% aluminum;
- from 35% to 41% aluminum, 30% to 36% titanium dioxide, and 27% to 31% boron oxide;
- from 50% to 97.5% aluminum oxide, 2% to 25% titanium, and 0.5% to 25% amorphous carbon.

A preferred liquid suspending medium for the slurry is monoaluminum phosphate and/or colloidal silica. Both these liquids are reactive with the reactants, which is desirable since they become an integral part of the final coating.

Water and acetone were also tested as liquid suspending mediums and found to be unsatisfactory since the low evaporation temperatures thereof resulted in cracks and distortion in the coatings during drying.

In the embodiment of a slurry adapted for joining metallic surfaces, preferred particulate constituents comprise, in weight percent based on the total weight of the constituents, the following groups:

- from 28% to 32% titanium dioxide, 25% to 27% boron oxide, 32% to 35% aluminum, 3% to 4% titanium, 1.5% to 2.0% boron, 3.8% to 4.5% nickel, and 0.7% to 1.1% phosphorous;
- from 60% to 70% titanium, and 30% to 40% boron;
- from 30% to 35% titanium, 15% to 20% boron, 38% to 44% nickel, and 8% to 10% phosphorus;
- from 12% to 20% titanium dioxide, 10% to 16% boron oxide, 15% to 20% aluminum, 0 to 10% iron, 15% to 17.5% titanium, 8% to 9.5% boron, 19% to 22% nickel, and 4% to 5% phosphorus;
- from 67% to 70% chromic oxide, 6.5% to 8% carbon, and 23% to 26% aluminum.

All constituents should have an average particle size of less than 53 microns (i.e., passing 270 mesh screen). Materials are generally available having average particle sizes of −300 or −325 mesh screen.

The amount of liquid suspending medium is not critical and is selected to provide a viscosity suitable to permit application by painting, spraying or dipping, while at the same time avoiding excessive run-off. When coating metallic or ceramic or refractory surfaces, it is preferred to form a layer of slurry having a thickness of about 0.2 to 0.3 mm. In general, from about 1 to about 12 parts by weight of the powdered constituents are dispersed uniformly in from about 2 to about 5 parts by volume of the liquid suspending medium, although these limits can be varied depending upon the particular mixture of constituents.

Tests have been conducted on slurries for coating ceramic surfaces. For test purposes five examples of powdered constituents were prepared as follows:

Example 1—titanium 80%, crystalline carbon 20%

Example 2—titanium 80%, amorphous carbon 20%

Example 3—titanium 64%, aluminum 36%

Example 4—titanium dioxide 33%, boron oxide 29%, aluminum 38%.

Example 5—aluminum oxide 95–97.5%, titanium 2–4%, amorphous carbon 0.5–1%.

The percentages above are by weight. The titanium, carbon, and aluminum powders were obtained from ALFA or from Johnson Matthey Electric and ranged in purity from 99.0% to 99.5%. The crystalline and amorphous carbon powders were −300 mesh particle size, while the titanium and aluminum powders were −325 mesh. Titanium dioxide and boron oxide were obtained from Fisher, grade designations LO-904811 and LO-904641, respectively. Aluminum oxide was obtained from Alcoa Chemicals, grade designation A-17. Slurries were prepared by mixing uniformly 1 part by weight of the powders of the above examples with 2 parts by volume of each of four different liquid suspension media, viz., water, colloidal silica, monoalunimum phosphate and acetone, for Examples 1–4. As indicated above, preliminary tests indicated that water and acetone were unsuitable, and hence were not subjected to further tests. Monoaluminum phosphate (MAP) was found to be the preferred suspension medium.

For Example 5, the liquid suspension media were MAP 90% and colloidal silica 10% by volume, and MAP 95% and colloidal silica 5% by volume. The colloidal silica was REMET-SP30. Slurries were prepared by mixing uniformly 1 part by weight of the powder with 1.5 part by volume of suspension medium.

Fused silica substrates were coated by painting to form a layer of 0.25 mm (250 microns) thickness with slurries of each of the above examples 1–4 in MAP. After coating, reaction was initiated either by a wave propagation mode or thermal explosion mode of reaction in air.

In the wave propagation mode, reaction was started from one part of the sample with a butane flame torch, and the reaction then self-propagated across the sample. Since each of examples 1–4 had a different heat of reaction, it was necessary to heat samples to different initial temperatures to sustain the combustion synthesis.

In the thermal explosion mode reaction was started simultaneously in all parts of the sample subsequent to a heating and drying step. Samples of Examples 1–4 were heated from room temperature to 1000° C. and then cooled slowly in a furnace to avoid possible surface cracks in the coatings. The thermal explosion mode in air is the preferred method.

Examples 1–4 reacted by combustion synthesis as follows:

$$Ti+C\ (crystalline \rightarrow TiC \quad 1$$

$$Ti+C\ (amorphous) \rightarrow TiC \quad 2$$

$$Ti+Al \rightarrow TiAl \quad 3$$

$$\tfrac{10}{3}Al+TiO_2+B_2O_3 \rightarrow TiB_2+\tfrac{5}{3}Al_2O_3 \quad 4$$

The surfaces resulting from reactions 1 and 2 above had lower porosity than those produced by reactions 3 and 4.

Fused silica specimens coated with titanium carbide (Examples 1 and 2) were immersed in molten aluminum at 700° C. and kept in the melting furnace for 7 days. For comparison uncoated fused silica specimens were also subjected to the same test. At the end of 7 days, samples were cut along their cross-sections and tested. In the ceramic specimens coated with titanium carbide, diffusion of aluminum into the ceramic body was not observed. In contrast to this, aluminum penetration to a depth of 0.5 mm occurred in the uncoated specimens.

The slurry of Example 5 was applied by dipping silica crucibles two or three times at 5 second intervals to obtain a coating thickness of 150–200 microns. After coating, samples were dried for 10 hours. The coated crucibles were then placed in a furnace which reached 1200° C. in 2 hours and held at that temperature for 4 hours. The resulting combustion synthesis reaction (by thermal explosion mode in air) was as follows:

$$Al_2O_3+2Ti+C+O_2 \rightarrow Al_2O_3+TiO_2+TiC \quad 5$$

Molten stainless steel was then poured into the coated silica crucibles. It was found that these crucibles could be reused for several heats of molten stainless steel. By way of comparison, an uncoated silica crucible could be used for only one heat due to extensive surface damage.

Numerous tests have been conducted on slurries of the invention for use in joining metallic surfaces. The following test procedures were used:

A—Samples in the form of rods (0.54 cm diameter, 5 cm length) were clamped in a Gleeble machine with the combustible slurry between the rod ends, using various joint geometries. (The Gleeble is a standard thermomechanical apparatus which applies both stress and temperature to a sample.) Current was then passed through each sample until the mixture reached ignition temperature and underwent combustion.

B—Bars of various sizes were butted together with a slurry in MAP between them. Another combustible slurry was spread around the joint and ignited using an oxyacetylene torch. After combustion the slurry outside the joint was then chipped off.

C—Bars of various sizes were butted together, using a butt joint, with a slurry between the abutting ends and ignited by an oxyacetylene torch.

D—Mild steel bars of various thicknesses were joined using a silver brazing alloy foil in the joint and a combustible slurry around the outside of the joint.

The compositions, in weight percent, of the powdered constituents were as follows:

Example 6—titanium dioxide 30%, boron oxide 26.25%, aluminum 33.75%, titanium 3.25%, boron 1.75%, nickel 4.1%, phosphorus 0.9%;

Example 7—titanium 65%, boron 35%;

Example 8—titanium 32.5%, boron 17.5%, nickel 41%, phosphorus 9%;

Example 9—titanium dioxide 16.67%, boron oxide 14.58%, aluminum 18.75%, titanium 16.25%, boron 8.75%, nickel 20.5%, phosphorus 4.5%;

Example 10—chromic oxide 68.5%, carbon 7.2%, aluminum 24.3%.

Slurries were prepared of all the above examples in MAP by mixing 1 gram of the powder with 0.3 cc of MAP. Maximum reaction temperatures were determined in preliminary tests, and it was found that the highest reaction temperature was achieved by Example 6. This composition was therefore used in further tests.

Test data on the four procedures by which rods or bars were joined are tabulated below. While results were not uniformly successful with the slurries of the invention, comparison of joints prepared by procedure D with a conventional fusion welded joint using an oxyacetylene torch indicated that joint strength when using an optimum amount of slurry was generally comparable with joint strength obtained by conventional welding. In this connection the joint thickness was found to have a marked effect on joint strengths both for procedure D and conventional fusion welded joints, as shown in Table 5.

TABLE 1

| Slurry composition (in MAP) | Joint geometry | Result |
|---|---|---|
| | Stainless Steel Rods | |
| Ex. 8 | Lap joint | Did not weld to surface of either rod. |
| Ex. 8 | Mortise and tenon joint | Rods welded but broke apart when hit at joint. |
| Ex. 8 + 33% Al—67% Fe | Mortise and tenon joint | Rods welded but broke apart when hit at joint. |
| Ex. 9 + 10% Fe | Butt joint | Rods welded together. Combustion visible. |
| | Aluminum Rods | |
| Ex. 8 + 33% Al—67% Fe | Mortise and tenon joint | Rods welded but broke apart when hit at joint. |
| Ex. 8 | Butt joint | Welded to surface of one rod. |

TABLE 2

| Bar dimensions in cms. | Slurry inside joint | Slurry outside joint | Result |
|---|---|---|---|
| | Stainless Steel Bars | | |
| 0.515 × 2 × 1.5 | Ex. 9 + Cu (9:1) | Ex. 8 | Bars welded but broke when bent by hand. |
| 0.515 × 2 × 1.5 | Ex. 9 + Cu (1:4) | Ex. 8 | Bars welded but broke when bent by hand. |
| | Aluminum Bars | | |
| 0.515 × 2 × 1.5 | Ex. 9 + Cu (9:1) | Ex. 8 | Bars welded but broke when bent by hand. |
| 0.515 × 2 × 1.5 | Ex. 9 + Cu (3:2) | Ex. 8 | Bars welded but broke when bent by hand. |
| | Mild Carbon Steel Bars | | |
| 0.336 × 3 × 15 | Ex. 6 + Ag (1:1) | Ex. 6 | Bars not welded |
| 0.31 × 0.9.1.2 | Ex. 6 + Ag (3:1) | Ex. 6 | Bars welded together. |
| 0.266 × 1.5 × 2 | Ex. 6 + Ag (1:1) | Ex. 6 | Bars not welded |
| 0.266 × 1.5 × 2 | Ex. 6 + Ag (1:1) | Ex. 6 | Bars welded together. |
| 0.266 × 1.5 × 2 | 14% Ex. 7 + 14% Ex. 10 + Ni—31.5% Al | Ex. 6 | Bars welded together. X-ray examination of cut & polished section of weld indicated presence of Ni. |
| | Copper Bars | | |
| 0.515 × 2 × 1.5 | Ex. 6 + Cu—7.4% P (1:1) | Ex. 6 | Bars not welded |
| 0.515 × 2 × 1.5 | Ex. 6 + Cu—7.4% P | Ex. 6 | No combustion inside joint. |

TABLE 2-continued

| Bar dimensions in cms. | Slurry inside joint | Slurry outside joint | Result |
|---|---|---|---|
| 0.515 × 2 × 1.5 | (7:3) Cu—7.4% P | Ex. 6 | Bars welded together. Cu—7.4% P melted. |
| 0.515 × 2 × 1.5 | Cu—7.4% P | Ex. 6 | Bars welded together. More uniform melting of Cu—7.4% P. |
| 0.515 × 2 × 1.5 | Cu—7.4% P + 30% Al | Ex. 6 | No combustion inside joint. |

TABLE 3

| Bar dimensions in cms. | Slurry inside joint | Result |
|---|---|---|
| | Copper Bars | |
| 0.515 × 2 × 1.5 | Ex. 7 | Combusted but did not weld. |
| 0.515 × 2 × 1.5 | Ex. 6 + Cu—7.4% P (4:6) | Bars not welded |
| 0.515 × 2 × 1.5 | Ex. 6 + Cu—7.4% P (7:3) | Bars not welded |
| | Mild Carbon Steel Bars | |
| 0.266 × 1.5 × 2 | Ex. 10 | Did not combust. |
| 0.266 × 1.5 × 2 | 90% Ex. 10 + 10% Ex. 7 | Did not combust. |
| 0.266 × 1.5 × 2 | Ex. 7 | Fully combusted but not welded. |

TABLE 4

| | Mild Carbon Steel Bars | | |
|---|---|---|---|
| Bar dimensions (in cms) | Inside Joint | Outside Joint | Joint strength of welds: (1) 40 gms slurry (2) 20 gms slurry |
| 0.266 × 2.98 × 15 | Ag foil | Ex. 6 | (1) 68 MPa (2) 63 MPa |
| 0.291 × 2.98 × 15 | Ag foil | Ex. 6 | (1) 58 MPa (2) 38 MPa |
| 0.3365 × 2.98 × 15 | Ag foil | Ex .6 | (1) 52 MPa (2) 32 MPa |

TABLE 5

| | Joint strength of welds | | |
|---|---|---|---|
| Joint thickness (in cms) | 40 gms slurry | 20 gms slurry | Fusion weld oxyacetylene torch |
| 0.266 | 68 | 63 | 80 |
| 0.291 | 58 | 38 | 68 |
| 0.3365 | 52 | 32 | 56 |

We claim:

1. A slurry for coating metallic or ceramic and refractory surfaces, comprising:

a liquid suspending medium selected from the group consisting of monoaluminum phosphate, and colloidal silica; and particulate constituents suspended in said medium capable of undergoing exothermic reaction by combustion synthesis when ignited, said constituents being selected from the group consisting of from 75% to 85% titanium, and 15% to 25% crystalline carbon; from 75% to 85% titanium, and 15% to 25% amorphous carbon; from 60% to 68% titanium, and 32% to 40% aluminum; from 35% to 41% aluminum, 30% to 36% titanium dioxide, and 27% to 31% boron oxide; from 50% to 97.5% aluminum oxide, 2% to 25% titanium, and 0.5% to 25% amorphous carbon; and mixtures thereof.

2. The slurry of claim 1, wherein said particulate constituents have an average particle size of less than 53 microns (~270 mesh screen).

3. The slurry of claim 1, wherein the particulate constituent is from 75% to 85% titanium, and 15% to 25% crystalline carbon or from 75% to 85% titanium, and 15% to 25% amorphous carbon, and wherein the average particle size of titanium is greater than that of crystalline carbon, if present.

4. The slurry of claim 1, wherein about 1 part by weight of said particulate constituents is dispersed uniformly in about 1 to 2 parts by volume of said liquid suspending medium.

5. A slurry for joining metallic or ceramic surfaces, comprising:

a liquid suspending medium selected from the group consisting of monoaluminum phosphate, and colloidal silica; and particulate constituents suspended in said medium capable of undergoing exothermic reaction by combustion synthesis when ignited, said constituents being selected from the group consisting of from 28% to 32% titanium dioxide, 25% to 27% boron oxide, 32% to 35% aluminum, 3% to 4% titanium, 1.5% to 2.0% boron, 3.8% to 4.5% nickel, and 0.7% to 1.1% phosphorous; from 60% to 70% titanium, and 30% to 40% boron; from 30% to 35% titanium, 15% to 20% boron, 38% to 44% nickel, and 8% to 10% phosphorus; from 12% to 20% titanium dioxide, 10% to 16% boron oxide, 15% to 20% aluminum, 0 to 10% iron, 15% to 7.5% titanium, 8% to 9.5% boron, 19% to 22% nickel, and 4% to 5% phosphorus; from 67% to 70% chromic oxide, 6.5% to 8% carbon, and 23% to 26% aluminum; and mixtures thereof.

6. The slurry of claim 5, wherein said particulate constituents have an average particle size of less than about 53 microns (~270 mesh screen).

7. The slurry of claim 1 or 5, including particulate diluents selected from the group consisting of aluminum, iron, copper, silver, borides, carbides, nitrides, and silicides of titanium, niobium, molybdenum and chromium, and mixtures thereof.

8. The slurry of claim 1 or 5, wherein from about 8 to about 12 parts by weight of said particulate constituents are dispersed uniformly in about 2 to about 5 parts by volume of said liquid suspending medium.

* * * * *

UNITED STATES PATENT AND TRADEMARK OFFICE

CERTIFICATE OF CORRECTION

PATENT NO. : 5,468,690

DATED : November 21, 1995

INVENTOR(S) : Jainagesh A. Sekhar, Vidya Subramanian, and Necip Suat Canarslan

It is certified that error appears in the above-indentified patent and that said Letters Patent is hereby corrected as shown below:

Column 8, line 46 (claim 5), "7.5%" should read --17.5%--.

Signed and Sealed this

Thirteenth Day of August, 1996

Attest:

BRUCE LEHMAN

*Attesting Officer*

*Commissioner of Patents and Trademarks*